United States Patent [19] [11] Patent Number: 5,317,149
Uebbing et al. [45] Date of Patent: May 31, 1994

[54] OPTICAL ENCODER WITH ENCAPSULATED ELECTROOPTICS

[75] Inventors: John J. Uebbing, Palo Alto; Thomas J. Lugaresi, Los Gatos, both of Calif.; David Pitou, Meridian, Id.

[73] Assignee: Hewlett-Packard Company, Palo Alto, Calif.

[21] Appl. No.: 975,609

[22] Filed: Nov. 12, 1992

[51] Int. Cl.$^5$ .............................................. G01D 5/34
[52] U.S. Cl. ................................. 250/231.14; 250/216
[58] Field of Search ................ 250/231.13, 231.12, 250/231.14, 231.16, 231.18, 237 G, 216; 356/395

[56] References Cited

U.S. PATENT DOCUMENTS

| | | | |
|---|---|---|---|
| 4,204,115 | 5/1980 | Boldridge | 250/231.14 |
| 4,339,198 | 7/1982 | Leuchter | 250/231.16 |
| 4,340,814 | 7/1982 | DiCiaccio et al. | 250/231.14 |
| 4,389,902 | 6/1983 | Kataoka et al. | 250/231.14 |
| 4,451,731 | 5/1984 | Leonard | 250/237 |
| 4,691,101 | 9/1987 | Leonard | 250/231 |
| 4,952,799 | 8/1990 | Loewen | 250/231 |
| 4,972,089 | 11/1990 | Stevenson | 250/216 |
| 5,177,357 | 1/1993 | Yamaguchi et al. | 250/231.16 |

Primary Examiner—David C. Nelms

[57] ABSTRACT

An encapsulated reflective sensor for use in conjunction with a code wheel for determining the motion and position of a shaft has a light emitting device and photodetector array contained within a transparent encapsulant. The encapsulant has a convex curved surface which prevents light from the light emitting device from impinging on the photodetector array. An emitter lens is formed by the convex curved surface between the light emitting device and the code wheel. The emitter lens magnifies and concentrates the light toward the code wheel. As the code wheel turns with the shaft, the light incident on the wheel is modulated and reflected toward the photodetector array. A second detector lens may be used between the code wheel and photodetector array for concentrating the modulated light reflected from the code wheel toward the photodetector array.

20 Claims, 4 Drawing Sheets

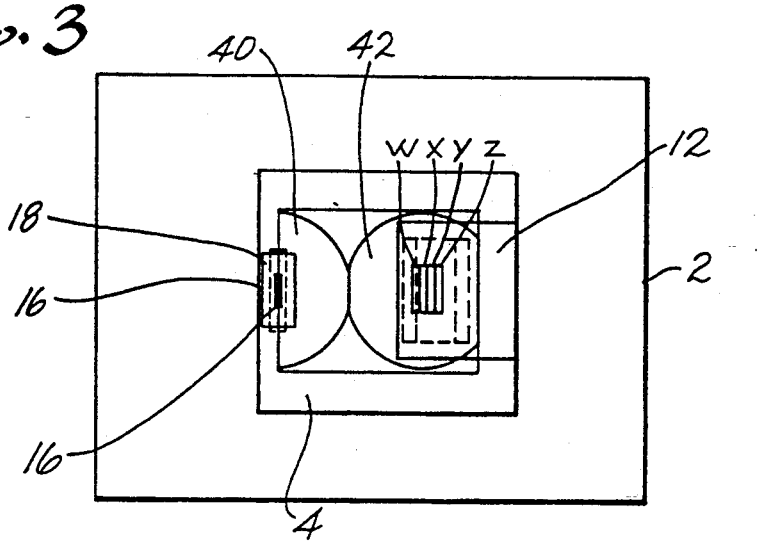
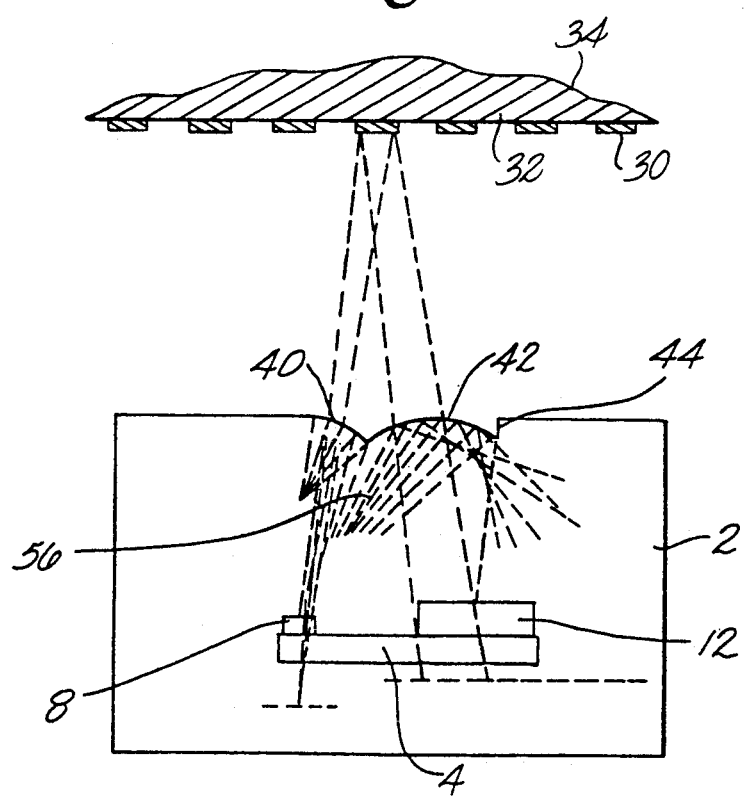

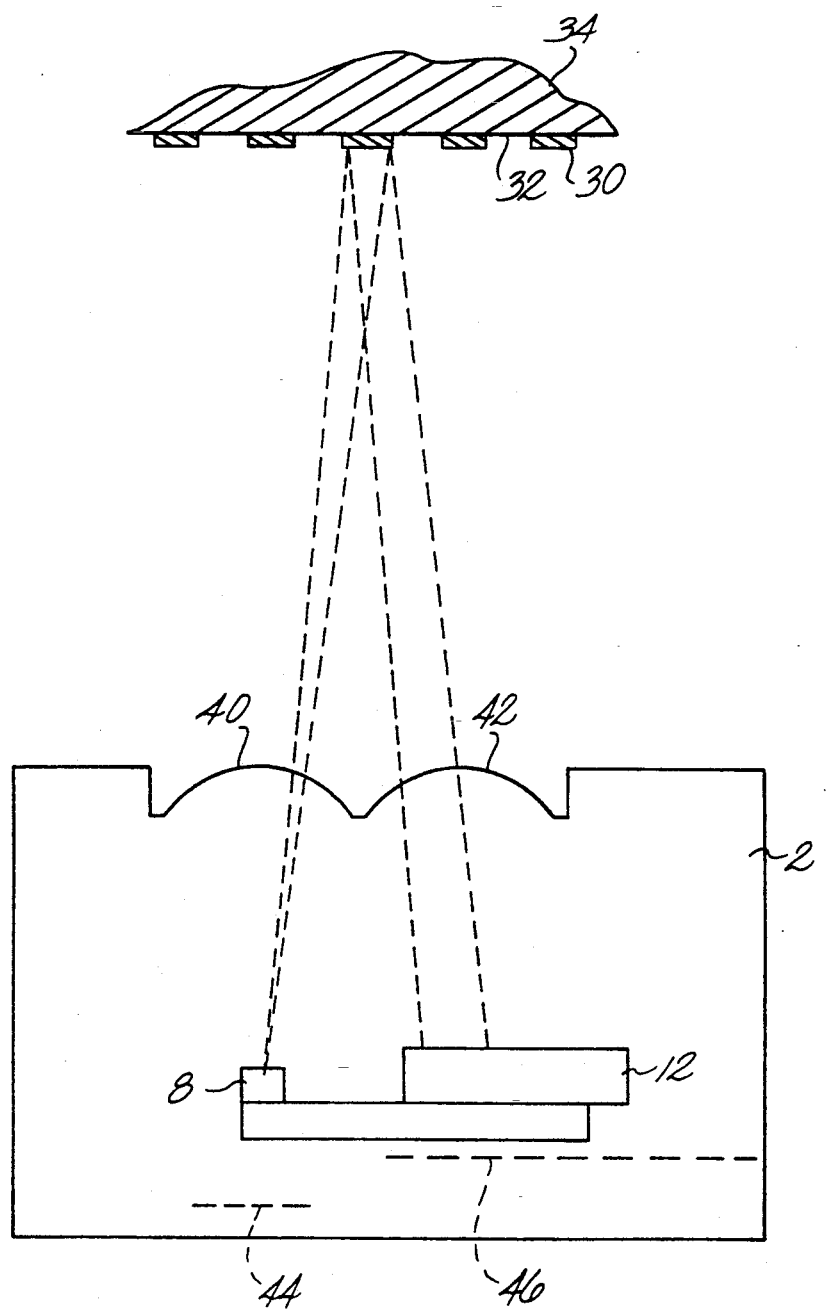

OPTICAL ENCODER WITH ENCAPSULATED ELECTROOPTICS

FIELD OF THE INVENTION

This invention relates generally to optical encoders. In particular, this invention relates to the optics of a reflective sensor used as part of an optical shaft angle encoder for producing electrical signals indicative of the angular position or motion of a shaft.

BACKGROUND OF THE INVENTION

Incremental optical shaft angle encoders are used for resolving the position or measuring rotation of a shaft. Exemplary shaft angle encoders are known from U.S. Pat. Nos. 4,451,731 and 4,691,101, for example. Such encoders include a light source for emitting a light beam, an encoder wheel for modulating the light beam in response to shaft rotation, and a photodetector assembly for receiving the modulated light and producing electrical signals indicating the amount of light received by the photodetectors.

As the light is modulated in response to shaft rotation, each electrical signal from the photodetector assembly produces a waveform The position of the shaft determines the position of each signal on its particular waveform, i.e., the phase of each signal. Therefore, the electrical signals from the detectors can be used to indicate shaft rotation Further, two or more properly out of phase signals, from separate photodetectors, can be used to indicate both direction and magnitude of rotation.

Some shaft angle encoders have a code wheel with alternating opaque and transparent areas, and the light source and photodetectors are on opposite faces of the code wheel. Other shaft angle encoders have reflective areas so that the light source and photodetectors can be on the same face of the code wheel.

One such encoder, disclosed in U.S. Pat. No. 4,952,799 issued to Loewen, provides a shaft angle encoder having a rotatable code wheel with a plurality of alternating reflective and nonreflective areas extending in a circumferential path around the wheel. A light emitter is provided for illuminating the reflective areas of the wheel and a plurality of photodetectors are arrayed on the same side of the code wheel as the light emitter for receiving modulated light which is directly reflected from the reflective areas on the code wheel. This produces a plurality of electrical signals indicative of code wheel position.

While the above-described encoder provides several advantages over the prior art, including relatively inexpensive cost and relatively small size, such an encoder having a light emitter and photodetectors on the same substrate suffers from certain drawbacks. In some cases light from the light emitter reflects off of the front surface of the encapsulation of the light emitter and onto the adjacent photodetectors. This causes an undesirable signal to occur on the photodetectors which lowers the overall accuracy of the encoder. Moreover, a relatively high light emitter drive current must be used to overcome these internal reflections and the operating distance between the sensor and reflective code wheel must be kept to a minimum. It is desirable to eliminate these undesirable effects while preserving the advantages of having the light emitter and photodetectors arrayed on the same substrate.

SUMMARY OF THE INVENTION

There is, therefore provided in practice of this invention according to a presently preferred embodiment, an optical encoder having an encapsulated reflective sensor for sensing modulated light reflected from reflective areas of a movable member. The sensor includes a light emitting device for illuminating the reflective and nonreflective areas of the movable member and at least one photodetector arrayed on the same substrate as the light emitting device for detecting the modulated light reflected from the movable member. The sensor also includes an immersion lens positioned between the light emitting device and the movable member for preventing light that would otherwise be reflected from the epoxy-air interface from reaching the detector directly. The lens also magnifies the image of the detector allowing for the use of smaller, less expensive detectors.

Preferably the encapsulated reflective sensor includes a separate emitter lens covering the light emitting device and a detector lens covering the photodetector. The light emitting device and photodetector are positioned in such a way that the light from the light emitting device is magnified and concentrated by the emitter lens toward the code wheel. Moreover, the modulated light reflected from the code wheel is magnified and concentrated toward the photodetector. With this dual lens configuration, smaller and less expensive components may be used while still maintaining a high degree of accuracy.

BRIEF DESCRIPTION OF THE DRAWINGS

These and other features and advantages of the present invention will be appreciated as the same becomes better understood by reference to the following detailed description when considered in connection with the accompanying drawings, wherein:

FIG. 3 is a top view of a dual lens encapsulated reflective sensor according to another embodiment of the present invention;

FIG. 4 is a semi-schematic cross-sectional view of the reflective sensor shown in FIG. 3, also showing internal reflections and light rays reflected from an exemplary code wheel;

FIG. 7 is a semi-schematic cross-sectional view of another embodiment of a reflective shaft angle encoder.

DETAILED DESCRIPTION

Figure 1:
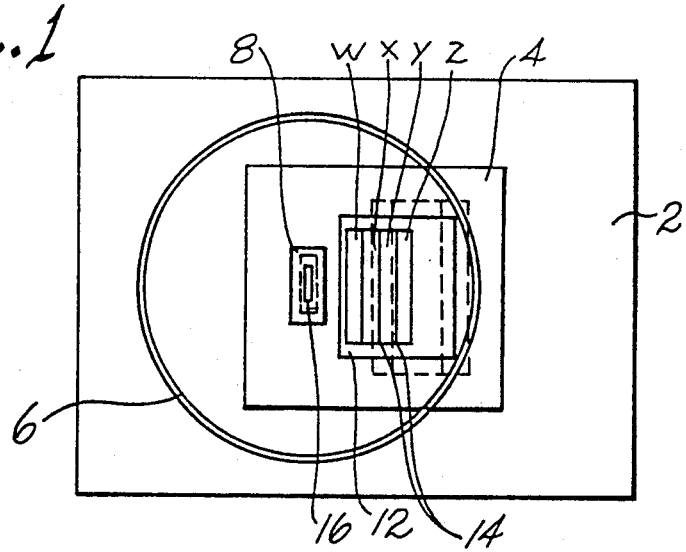
FIG. 1 is a top view of a single lens encapsulated reflective sensor according to one embodiment of this invention.

Referring to FIG. an exemplary single lens encapsulated reflective sensor according to the present invention is an integral structure which includes a transparent encapsulant 2, a platform 4, a light emitting device 8, a photodetector chip 12, and a lens surface 6. The encapsulant is composed of any suitable material, such as epoxy, which is transparent to light from the light emitting device. The platform contained within the encapsulant supports the light emitting device and the photodetector chip, which are substantially the same as those disclosed in U.S. Pat. No. 4,592,799, issued to Loewen, the contents of which are hereby incorporated by reference.

In an exemplary embodiment, the light emitting device 8 is a light emitting diode (LED). The LED is a conventional LED which emits essentially monochromatic light from a line 16. The line is ideally an elongated point source. As illustrated, however, the line has some width as it must necessarily have in any practical embodiment. In an exemplary embodiment, the light emitting line of the LED is about 64 micrometers wide and 320 micrometers long.

The photodetector chip 12 houses four elongated photodetectors w, x, y, z which are arrayed adjacent to the LED. In between each of the photodetector areas, and outward of the outermost photodetectors x, z, there are dummy doped areas 14 shorted to a conventional isolation layer or barrier for minimizing leakage current to and between the photodetectors. The photodetectors are connected to an electric circuit (not shown) which processes data accumulated by the sensor. For a more detailed description of the LED, photodetector array, and circuit refer to Loewen, U.S. Pat. No. 4,592,799.

The lens 6 is a convex curved surface on the front face of the transparent encapsulant. In an exemplary embodiment, the lens covers both the LED and the photodetectors. The lens, in this exemplary embodiment, is a spherical lens. However, an aspherical lens may be used. The lens is an interface between the encapsulant having an index of refraction greater than air and air having an index of refraction of one. As described more fully below, the lens operates to magnify and concentrate the light emitted by the LED.

Figure 2:
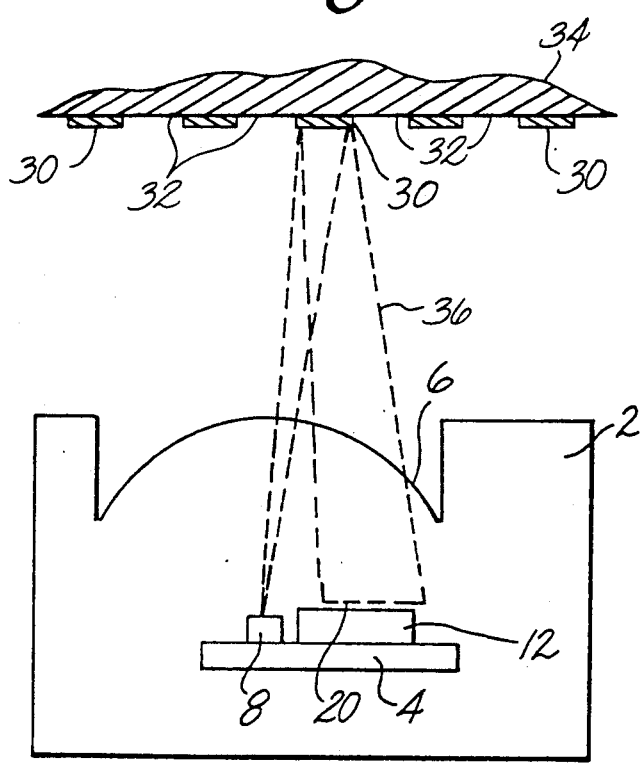
FIG. 2 is a semi-schematic cross-sectional view of the reflective sensor shown in FIG. 1, also showing light rays reflected from an exemplary code wheel.

Referring to FIG. 2, the single lens encapsulated reflective sensor is used in conjunction with a reflective shaft angle encoder such as the one described in U.S. Pat. No. 4,592,799, issued to Loewen. Loewen discloses a shaft angle encoder with a rotatable code wheel 34 having alternating reflective areas 30 and nonreflective areas 32 extending around the wheel. The nonreflecting areas may in fact be transmissive windows through the code wheel. Light from the LED travels along an optical path toward the wheel and directly illuminates the wheel. The light is reflected back toward the photodetector array by the reflective areas of the wheel and is modulated by the code wheel as the wheel rotates. The photodetectors are arrayed on the same side of the wheel as the LED for receiving the modulated light directly reflected from the reflective areas on the wheel.

Figure 5:
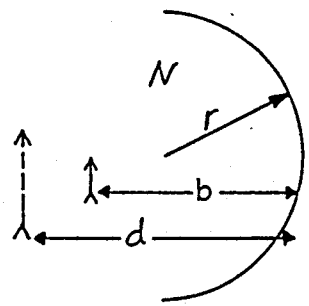
FIG. 5 is a schematic diagram of an exemplary spherical lens.

FIG. 5 shows a simple spherical immersion lens of the type which may be used with the present invention. The object, i.e., the LED and/or photodetector, is immersed in the encapsulant medium of index of refraction N (N for epoxy is about 1.55) at a distance b behind the front face of the lens having a radius r.

Following principles of elementary optics, the focal length of the lens is given by $$f = \frac{Nr}{N-1}$$

The magnification of the lens is given by $$M = \frac{f}{f-b} = \frac{rN}{rN - (N-1)b}$$

It should be apparent that with a lens having a radius r immersed in a medium of index N, the magnification of the lens can be altered simply by moving the object toward or away from the lens. For the single lens encapsulated sensor, M preferably equals N.

The location of the object image is at a distance d given by $$d = \frac{Mb}{N}$$

The LED virtual image is, for example, the image which would be seen looking at the LED from the code wheel through the lens.

The LED is essentially a Lambertian emitter. The emitting line 16 of the LED is normally uniformly bright, but its projected intensity diminishes as $\cos\theta$, where $\theta$ is the angle between the viewing direction and the normal to the LED surface. More precisely, for a Lambertian emitter, the intensity is given by $I = I_O \overline{\cos\theta}$ where $\overline{\cos\theta}$ is the average of the cosine over the solid angle and $I_O$ is the intensity of light at the surface of the LED. For example, when $\theta = 60°$ the LED intensity is down to 50% of $I_O$.

As the light emitted by the LED diverges toward the lens, the lens acts to magnify and concentrate the light toward the code wheel. In effect, the lens causes the divergent light to converge as it proceeds along the optical path toward the code wheel. As can be readily appreciated, such a lens arrangement provides notable advantages. The lens increases the intensity of the LED light output by $M^2$ where M is the magnification of the lens. With magnification, an LED with a lower drive current may be used to achieve the same overall results as compared to unmagnified output for use in a shaft angle encoder. A smaller and less expensive LED can be used with the lens. Moreover, the operating distance between the reflective areas on the code wheel and the photodetectors can be increased without sacrificing the overall accuracy of the shaft angle encoder.

Furthermore, while Loewen provides numerous advantages over the prior art, the invention suffers from the fact that light from the LED may be internally reflected from the front face of the encapsulation of the LED onto the photodetectors. This causes the photodetectors to have a high-bias or dark current which limits the overall accuracy of the encoder.

With the present invention, internal reflections within the encapsulant are largely reduced with the use of the lens. In this single lens embodiment, the LED is placed on the vertex of the lens. With this placement, light emitted by the LED which is internally reflected is reflected back toward the LED and does not illuminate the photodetectors. This is an important improvement over Loewen in which internal reflections from the surface of the LED encapsulant may reflect toward the photodetector and possibly distort the photodetector output signals. This has been a problem with reflective shaft angle encoders for over fifteen years and it is not known that any previous solutions have been proposed.

The photodetector circuits are arranged to measure the difference between illuminated and non-illuminated areas. Therefore, an increased signal strength is obtained by increasing illumination from code wheel reflection, reducing illumination from sources other than the reflective areas on the code wheel, or both.

As described in Loewen, modulated light reflected from the reflective areas of the code wheel is reflected at the angle of incidence and travels substantially the same distance back to the photodetectors. Thus, the light diverges as it follows an optical path toward the photodetector, and the area illuminated on the detector 12 (indicated by reference number 20) is twice as wide as the reflective area divided by the magnification of the lens. Thus, for encoding in the same manner as in the Loewen patent, the width of the full cycle of, say, four photodetectors should be twice as wide as the cycle on the code wheel divided by the magnification of the detector lens. (As noted in Loewen, one cycle on the code wheel is equivalent to of one reflective and non-reflective area; one full cycle of photodetectors is equivalent to the array comprising four photodetectors in this embodiment.) Due to the focusing of the light by the lens surface 6, each individual photodetector area can be significantly smaller than the photodetector used in the Loewen patent; each photodetector should have an area 20 1/M as large as those disclosed in Loewen.

The general pattern of illumination in a radial plane is illustrated schematically by dashed lines 36 in FIG. 2. It is assumed that illumination arises from a point source. (A line source is, in effect, a row of point sources.) In Loewen, the photodetector period is twice the code wheel period because the light spreads out twice as far. With the present invention, it will be appreciated that the photodetector physical period must be 2/M times the code wheel period because in effect, the detector is magnified by M.

Referring to FIGS. 3 and 4, a dual lens encapsulated reflective sensor is shown according to an alternate embodiment of the present invention. The layout and operation of the dual lens sensor is substantially similar to the single lens sensor described above, except that the dual lens sensor contains a separate emitter lens 40 and a detector lens 42. Because of the similarity between the alternate embodiments, like reference numerals are used to signify like parts.

With two lenses, a larger aperture is provided for the emitter and detector. Higher magnifications can be realized in excess of the refractive index of the encapsulant. Tests have shown that a magnification of approximately 2.6 is as large as practical when spherical lenses are used. Beyond this magnification, distortion occurs which lowers the accuracy of the sensor. Higher magnifications may be realized, however, with aspherical lenses.

In this embodiment of dual lens encapsulated sensor, the emitter lens 40 comprises half of a hemispherical lens and the detector lens 42 comprises three quarters of a hemispherical lens. Both lenses preferably have the same radius of curvature. The truncation of the lenses is used to prevent undesirable secondary reflections into the detectors. This is shown schematically by the internal light rays 56, none of which are reflected onto the photodetectors. Moreover, the lenses are close enough to the emitter and detector to prevent reflections from the flat portions of the top surface of the encapsulant.

Another embodiment of a dual lens encapsulated sensor is shown in FIG. 7. Because of the similarity between the alternate embodiments, like reference numerals are used to signify like parts. This embodiment differs from that shown in FIGS. 3 and 4 in that the emitter lens 40 and detector lens 42 are each circular in plan view instead of being truncated as in the previous embodiment. This view also illustrates in dashed lines 44 and 46 the virtual images of the LED and photodetector, respectively. These are the locations of the apparent images if the encapsulated sensor were viewed from the code wheel.

Referring to FIGS. 4 and 7, the embodiments of the dual lens encapsulated sensors are shown in conjunction with an exemplary code wheel 34 substantially similar to the one disclosed in Loewen and briefly described above with reference to FIG. 2. As with the single lens sensor, the emitter lens is useful for magnifying and thereby concentrating the light from the LED toward the code wheel. The detector lens is further useful for concentrating reflected light from the code wheel toward the photodetector array. This provides a significant benefit in that less expensive and smaller photodetectors may be used to realize the same accuracy as a sensor having no lenses or only one lens.

The signal on the detector is given by the solid angle subtended by the detector times $I_O \cos\theta$ where $\cos\theta$ is the average of the cosine over the solid angle. The solid angle is given by $$\frac{M^2 A_D \cos\theta}{2(s + d)^2}$$

where $A_D$ is the unmagnified detector area, M is the detector lens magnification, s is the spacing from the lens to the code wheel, and d is the distance of the virtual image of the photodetector behind the lens. The on-axis intensity from the emitter is given by $I_O M^2$ where $I_O$ is the unmagnified intensity and M is the emitter magnification. The total relative signal is then given by:

$$S_R = \frac{M^2 I_0 M^2 A_D}{4(s + d)^2} = \frac{A_D}{4} \left[ \frac{M^2}{s + \frac{Mb}{N}} \right]^2$$

As mentioned above, the gain in signal strength for one lens is proportional to $M^2$. Remarkably, the gain in signal for two lenses is proportional to $M^4$. It will be appreciated that such a gain in intensity provides for numerous advantages, as described above.

Figure 6:
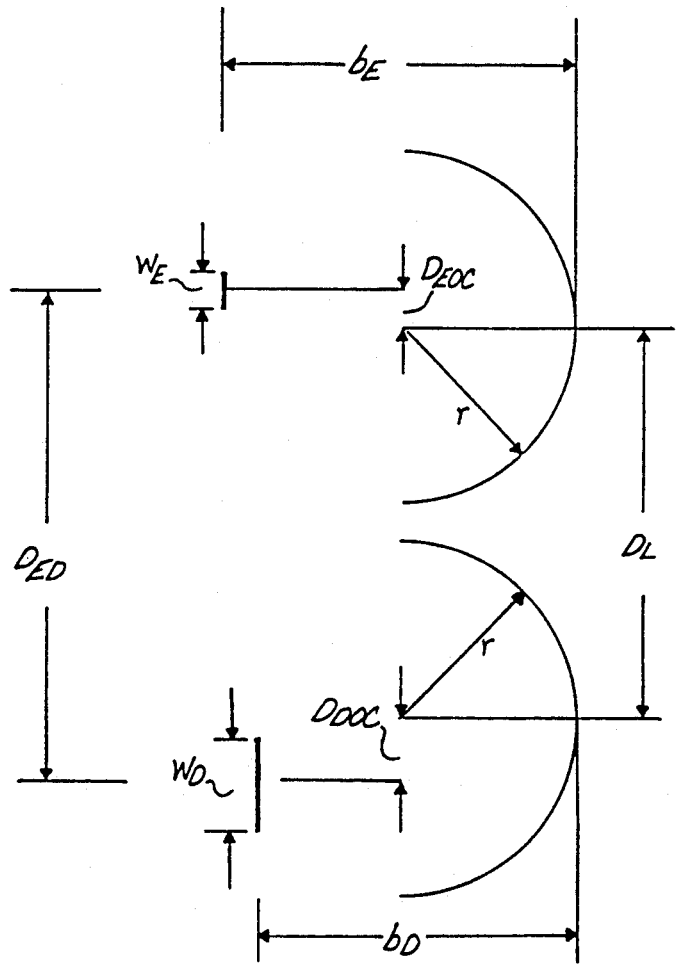
FIG. 6 is a schematic diagram showing dimensions of an exemplary dual lens encapsulated reflective sensor.

Dimensions for an exemplary dual lens encapsulated sensor are noted with reference to FIG. 6. The emitter lens radius $r_E$ and detector lens radius $r_D$ are each 0.645 mm. The distance between the vertex of the lenses, $D_L$, is 1.40 mm. The off-center distance of the LED from the vertex of the emitter lens, is 0.10 mm. Similarly, the off-center distance of the photodetector from the vertex of the detector lens, $D_{OCD}$, is 0.10 mm. The width of the exemplary LED, $W_E$, is 0.06 mm. The width of the exemplary photodetector array, $W_D$, is 0.25 mm. The distance between the LED and photodetector, $D_{ED}$, is 1.60 mm. The distance between the LED and the front face of the emitter lens $b_E$ is 1.20 mm. The distance between the photodetector and the front face of the detector lens $b_D$ is 1.12 mm. The LED and photodetector array are positioned in such a way to prevent unwanted internal reflections from reaching the photodetector.

With such a configuration, the virtual image of the LED, $d_E$, is located 3.53 mm away from the front face of the emitter lens and the virtual image of the photodetector, $d_D$, is located 2.91 mm away from the front face of the detector lens. The code wheel should be aligned accordingly. In practice, the optimum code wheel position, s, above the surface of the sensor for a sensor having the above noted dimensions is between about one millimeter and three millimeters. The range of distances indicates the considerable tolerance of code wheel position which can be achieved because of magnification by embedding the light emitter and photodetectors in immersion lenses. It should also be appreciated that the above-noted dimensions allow the entire encapsulated reflective sensor to be housed in a conventional surface mount package.

It will be appreciated that although only a few exemplary embodiments of encapsulated reflective sensor have been described and illustrated, numerous modifications and variations will be apparent to those skilled in the art. For example, a single lens may be used over the emitter or photodetector or both. Likewise, lenses of various shapes and magnifications may be used to achieve optimum results with different code wheels. The code wheels may be moved various distances from the sensor. In any particular embodiment, the size of the entire sensor or of the photodetector array may vary. Although the exemplary embodiments are with reference to a rotatable shaft angle encoder, it will be apparent that similar principles are applicable to a linear position encoder, for example. Therefore, it should be understood that, within the scope of the appended claims, the invention may be practiced otherwise than as specifically described.

What is claimed is:

1. An optical encoder for sensing modulated light reflected from a movable member, the sensor comprising:
   a light emitting device having a light output for illuminating the movable member;
   at least one photodetector for detecting the modulated light reflected from the movable member;
   a transparent medium encapsulating the light emitting device and the photodetector; and
   a lens surface on the medium in an optical path defined between the light emitting device, the movable member, and the photodetector, and wherein the width of each cycle of photodetector area is twice the width of each cycle of reflective and nonreflective areas on the movable member divided by magnification of the detector lens.

2. An optical encoder for sensing modulated light reflected form a movable member, the sensor comprising:
   a light emitting device having a light output for illuminating the movable member;
   at least one photodetector for detecting the modulated light reflected from the movable member;
   a transparent medium encapsulating the light emitting device and the photodetector; and
   a lens surface on the medium in an optical path defined between the light emitting device, the movable member, and the photodetector, wherein the lens surface comprises an emitter lens located in the optical path between the light emitting device and the movable member for concentrating the light output from the light emitting device before it illuminates the movable member.

3. The optical encoder of claim 2 wherein the emitter lens has a convex spherical surface.

4. The optical encoder of claim 2 wherein the emitter lens has a magnification equal to or greater than the index of refraction of the medium.

5. The optical encoder of claim 2 wherein the emitter lens is truncated.

6. An optical encoder for sensing modulated light reflected from a movable member, the sensor comprising:
   a light emitting device having a light output for illuminating the movable member;
   at least one photodetector for detecting the modulated light reflected from the movable member;
   a transparent medium encapsulating the light emitting device and the photodetector; and
   a lens surface on the medium in an optical path defined between the light emitting device, the movable member, and the photodetector, wherein the lens surface comprises a detector lens located in the optical path between the movable member and the photodetector for concentrating the modulated light before the modulated light is detected by the photodetector.

7. The optical encoder of claim 6 wherein the detector lens has a convex spherical surface.

8. The optical encoder of claim 6 wherein the detector lens has a magnification equal to or greater than the index of refraction of the medium.

9. The optical encoder of claim 6 wherein the detector lens is truncated.

10. An optical encoder for sensing modulated light reflected from a movable member, the sensor comprising:
    a light emitting device having a light output for illuminating the movable member;
    at least one photodetector for detecting the modulated light reflected from the movable member;
    a transparent medium encapsulating the light emitting device and the photodetector; and
    a lens surface on the medium in an optical path defined between the light emitting device, the movable member, and the photodetector, wherein the lens surface comprises first and second convex spherical surfaces;
    the first convex spherical surface forming an emitter lens between the light emitting device and the movable member, the light emitting device being located at a greater distance from the first convex spherical surface than the vertex of the emitter lens; and
    the second convex spherical surface forming a detector lens between the movable member and the photodetector, the photodetector being located at a greater distance from the convex surface of the detector lens than the vertex of the detector lens.

11. An optical encoder comprising:
    a light emitting device for emitting light along an optical path;
    a movable member positioned in the optical path having alternating reflective and nonreflective areas for modulating light from the light emitting device in response to movement of the member,
    at least one photodetector positioned in the optical path for detecting the modulated light;
    an emitter lens covering the light emitting device for preventing light not modulated in response to the movement of the movable member from reaching the photodetector; and
    a detector lens for concentrating the modulated light from the movable member toward the photodetector, wherein the width of each cycle of photodetector area is twice the width of each cycle of reflective and nonreflective areas on the movable member divided by magnification of the detector lens.

12. The optical encoder of claim 11 wherein the emitter lens and detector lens are immersion lenses.

13. An optical encoder comprising:
a movable code member having alternating reflective and nonreflective areas;
a platform;
a light emitting device located on the platform for illuminating reflective areas on the code member;
a photodetector located on the platform for receiving light reflected from such reflective areas, the light emitting device nd photodetector being located on the same side of the code member;
a transparent encapsulant embedding the light emitting device and the photodetector; and
a convex surface on the encapsulant in the optical path between the light emitting device, the code member and the photodetector.

14. The optical encoder of claim 13 wherein the convex surface has a magnification equal to or greater than the index of refraction of the encapsulant.

15. The optical encoder of claim 13 wherein the convex surface comprises a first convex surface between the light emitting device and the code member, and a second convex surface between the code member and the photodetector.

16. The optical encoder of claim 15 wherein the first and second convex lens surfaces are arranged to prevent internally reflected light from falling on the photodetector.

17. The optical encoder of claim 13 wherein the convex surface has a spherical curvature, the light emitting device is located at the vertex of the spherical curvature, and the convex surface has a magnification equal to the index of refraction of the encapsulant.

18. The optical encoder of claim 13 wherein the convex surface comprises an emitter lens in the form of a hemisphere in a first optical path defined between the light emitting device and the code member and a detector lens in the form of a hemisphere in a second optical path defined between the code member and the photodetector.

19. The optical encoder of claim 13 wherein the convex surface comprises an emitter lens in the form of half of a hemisphere in a first optical path defined between the light emitting device and the code member and a detector lens in the form of three fourths of a hemisphere in a second optical path defined between the code member and the photodetector.

20. The optical encoder of claim 18 wherein the light emitting device is located at a greater distance from the convex surface of the emitter lens than the vertex of the emitter lens and the photodetector is located at a greater distance from the convex surface of the detector lens than the vertex of the detector lens.

* * * * *